United States Patent
Gerasimov

(10) Patent No.: US 10,074,392 B1
(45) Date of Patent: Sep. 11, 2018

(54) TECHNIQUES FOR CLEARLY DISTINGUISHING BETWEEN NEIGHBORING SPIRALS IN AN SSW SCHEME

(71) Applicant: KABUSHIKI KAISHA TOSHIBA, Tokyo (JP)

(72) Inventor: Anton Gerasimov, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/454,885

(22) Filed: Mar. 9, 2017

(51) Int. Cl.
- *G11B 20/02* (2006.01)
- *G11B 5/596* (2006.01)
- *G11B 5/02* (2006.01)
- *G11B 20/18* (2006.01)

(52) U.S. Cl.
CPC .......... *G11B 5/59661* (2013.01); *G11B 5/02* (2013.01); *G11B 5/59638* (2013.01); *G11B 20/18* (2013.01)

(58) Field of Classification Search
None
See application file for complete search history.

(56) References Cited

U.S. PATENT DOCUMENTS

| | | | |
|---|---|---|---|
| 7,230,789 B1 * | 6/2007 | Brunnett | G11B 5/59633 360/75 |
| 7,414,809 B2 | 8/2008 | Smith et al. | |
| 7,440,210 B1 | 10/2008 | Lee | |
| 7,561,359 B1 | 7/2009 | Jeong et al. | |
| 7,623,313 B1 * | 11/2009 | Liikanen | G11B 5/59627 360/48 |
| 7,688,542 B2 * | 3/2010 | Chan | G11B 5/59644 360/77.05 |
| 8,634,154 B1 * | 1/2014 | Rigney | G11B 5/59661 360/48 |
| 2011/0176400 A1 * | 7/2011 | Gerasimov | G11B 5/59661 369/47.15 |

* cited by examiner

Primary Examiner — K. Wong
(74) Attorney, Agent, or Firm — Patterson & Sheridan, LLP

(57) ABSTRACT

During in-drive writing of a servo spiral on a disk surface, a servo spiral can be distinguished during demodulation from adjacent servo spirals on the same disk surface. When a set of servo spirals is written on a disk surface, a first spiral is written to include a first identifying characteristic and the following spiral is written to include a second identifying characteristic. The identifying characteristic may include embedded sync marks encoding a certain numerical value, a unique frequency of high-low transitions included in each spiral, and/or a unique frame size.

17 Claims, 10 Drawing Sheets

TECHNIQUES FOR CLEARLY DISTINGUISHING BETWEEN NEIGHBORING SPIRALS IN AN SSW SCHEME

BACKGROUND

In a typical hard disk drive (HDD), servo sectors on the disk are used to provide position information about the location of a magnetic head over a disk surface. A common approach for writing such servo information on one or more disk surfaces in an HDD is referred to as spiral-based self-servo writing, or spiral-based SSW. According to this approach, multiple spiral-shaped servo information patterns (or "servo spirals") are written on at least one disk surface prior to the SSW process. During the SSW process, a magnetic head of the HDD is positioned relative to a disk surface based on the servo spirals, so that the final servo information (the servo sectors) can be written on the disk surface by the magnetic head.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing.

In light of this, in-drive spiral-writing schemes have been employed, in which an HDD itself writes servo spirals prior to performing the SSW process. For example, a set of coarsely positioned spirals may be written by the HDD while the actuator is moved across a disk surface by applying a suitable open-loop voltage profile, or by using velocity control that is based on back electromotive force (back-EMF) feedback. More precisely positioned spirals may then be written by demodulating signals from the coarsely positioned spirals.

However, because in-drive spiral writing methods can have significant velocity variation while individual spirals are written, differences in spiral-to-spiral spacing are common. In fact, neighboring spirals written by in-drive spiral writing methods can be located so closely to each other that, during subsequent demodulation of the servo spirals, the servo interrupt service routine for demodulating the spirals may not have sufficient time, after processing data for the first spiral, to process data for the second spiral, thereby skipping the timing and position information provided by the second spiral. In addition, neighboring spirals may cross, so that during demodulation a subsequent spiral may be read before an antecedent spiral. In either case, such loss or scrambling of servo information can result in loss of synchronization between firmware spiral numbers and spiral data tables storing data for each of the spirals written on the disk surface. Such issues during servo spiral demodulation can require rework or scrapping of the HDD.

SUMMARY

One or more embodiments provide systems and methods for positioning a write head based on signals generated by a read head as the read head crosses a set of reference spirals, even when one or more reference spirals in the set is unreadable or intersects with other reference spirals. Spirals in the set of references spirals can be distinguished during demodulation from adjacent servo spirals in the same set of spirals. Specifically, when a set of servo spirals is written on a disk surface, a first spiral is written to include a first identifying characteristic and the following spiral is written to include a second identifying characteristic. Thus, every other spiral includes a different identifying characteristic, so that any spiral in the set of spirals can be distinguished from the two adjacent spirals in the same set of spirals. Alternatively, three (or more) different identifying characteristics may be associated with the spirals in the set of spirals, so that any spiral in the set of spirals can be distinguished from the four (or more) closest spirals in the same set of spirals. In some embodiments, the identifying characteristic includes embedded sync marks encoding a certain numerical value, a unique frequency of high-low transitions included in each spiral, and/or a unique distance between sync marks, also referred to as frame size.

A data storage device, according to an embodiment, includes a rotatable disk with a writable surface, a read head, a read channel, and a controller. The read head is configured to generate a first signal as the read head crosses a first servo spiral written on the writable surface and a second signal as the read head crosses a second servo spiral written on the writable surface, wherein the first and second servo spirals are each written continuously on the writable surface and start from a first radial location of the writable surface and end at a second radial location of the writable surface. The read channel is configured to detect signals of a predetermined frequency range. The controller is configured to distinguish between the first servo spiral and the second servo spiral when the detected signals include the first and second signals, based on identifying characteristics of the first and second signals.

According to another embodiment, a method of positioning a write head based on signals generated by a read head as the read head crosses a set of servo spirals that are each written continuously on a recording medium and start from a first radial location of the recording medium and end at a second radial location of the recording medium includes receiving a first signal of a predetermined frequency range as the read head crosses a first spiral of the set of servo spirals, determining a first index based on a first identifying characteristic of the first signal, after receiving the first signal, receiving a second signal of a predetermined frequency range as the read head crosses a second spiral of the set of servo spirals, determining a second index based on a second identifying characteristic of the second signal, determining that the second index is an unexpected index, and responsive to determining that the second index is the unexpected index, determining a radial position error and a timing error of the write head without using timing or position data included in the second signal.

A data storage device, according to another embodiment, includes a rotatable disk with a writable surface and a set of partial servo spirals formed on the writable surface. The set of partial servo spirals includes a first partial spiral that includes a first identifying characteristic and is configured to provide timing and position information for positioning a write head of the data storage device with respect to the writable surface during a rotation of the writable surface, and a second partial spiral that includes a second identifying characteristic and is configured to provide timing and position information for positioning a write head of the data storage device with respect to the writable surface during the rotation of the writable surface.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
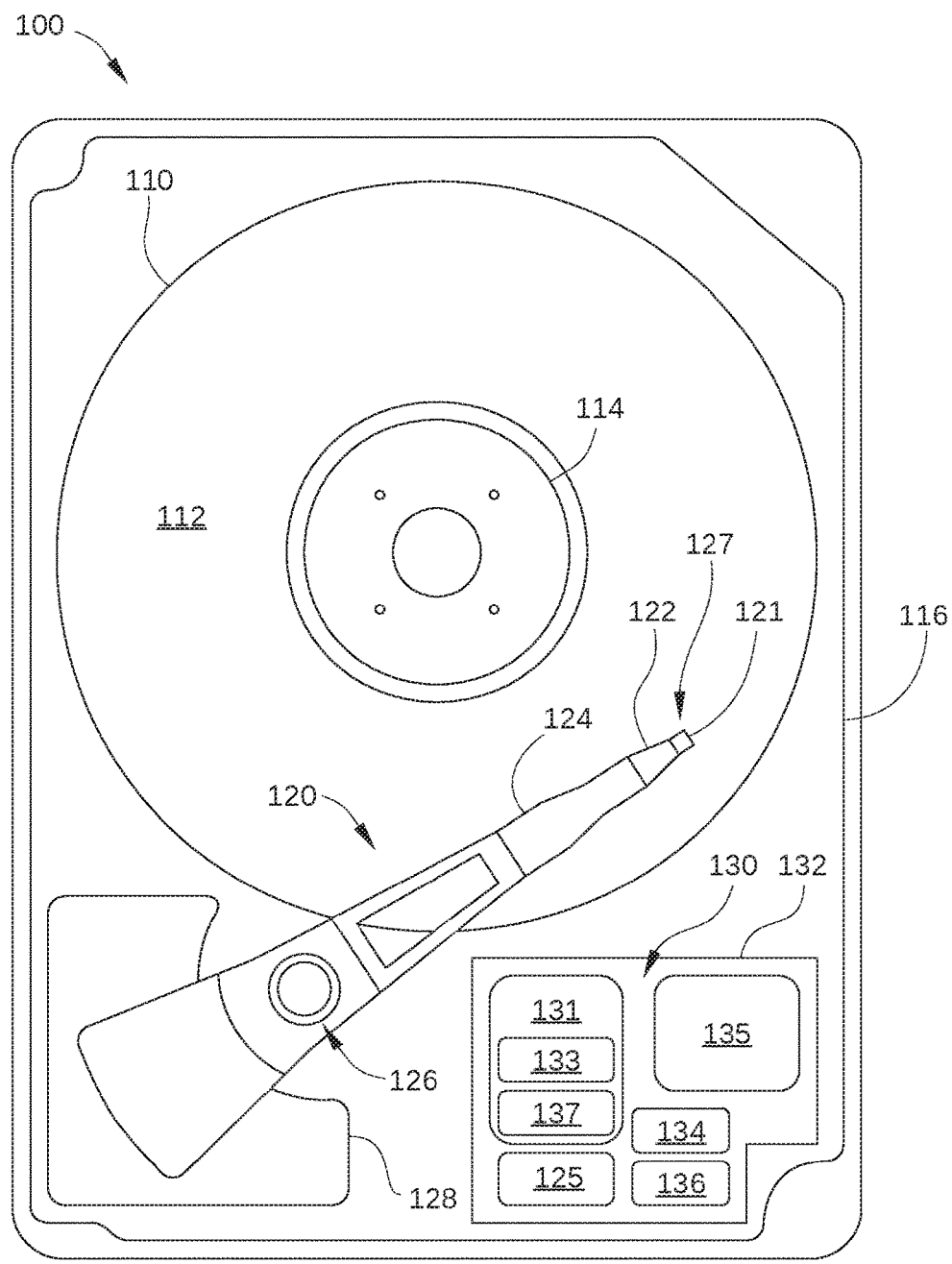
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes at least one storage disk 110 that is rotated by a spindle motor 114 and includes a plurality of concentric data storage tracks are disposed on a surface 112 of storage disk 110. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read channel 137, a microprocessor-based controller 133, random-access memory (RAM) 134 (which may be a dynamic RAM and is used as a data buffer) and/or a flash memory device 135 and a flash manager device 136. In some embodiments, read channel 137 and microprocessor-based controller 133 are included in a single chip, such as a system-on-chip 131. In some embodiments, HDD 100 may further include a motor-driver chip that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on base plate 116 or actuator arm 120, or both.

For clarity, HDD 100 is illustrated with a single storage disk 110 and a single actuator arm assembly 120. HDD 100 typically includes multiple storage disks and multiple actuator arm assemblies. In addition, each side of storage disk 110 typically has a corresponding read/write head associated therewith and coupled to a flexure arm.

When data are transferred to or from storage disk 110, actuator arm assembly 120 sweeps an arc between the inner diameter (ID) and outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

In order for HDD 100 to perform SSW and write the above-described servo wedges on storage disk 110 with the necessary precision for proper operation of HDD 100, position and timing information are provided to the disk drive servo system of HDD 100. The position and timing information that enable the internal servo system of HDD 100 to perform SSW is typically in the form of reference spiral tracks or "servo spirals" written on storage disk 110. One embodiment of such servo spirals is illustrated in FIG. 2.

Figure 2:
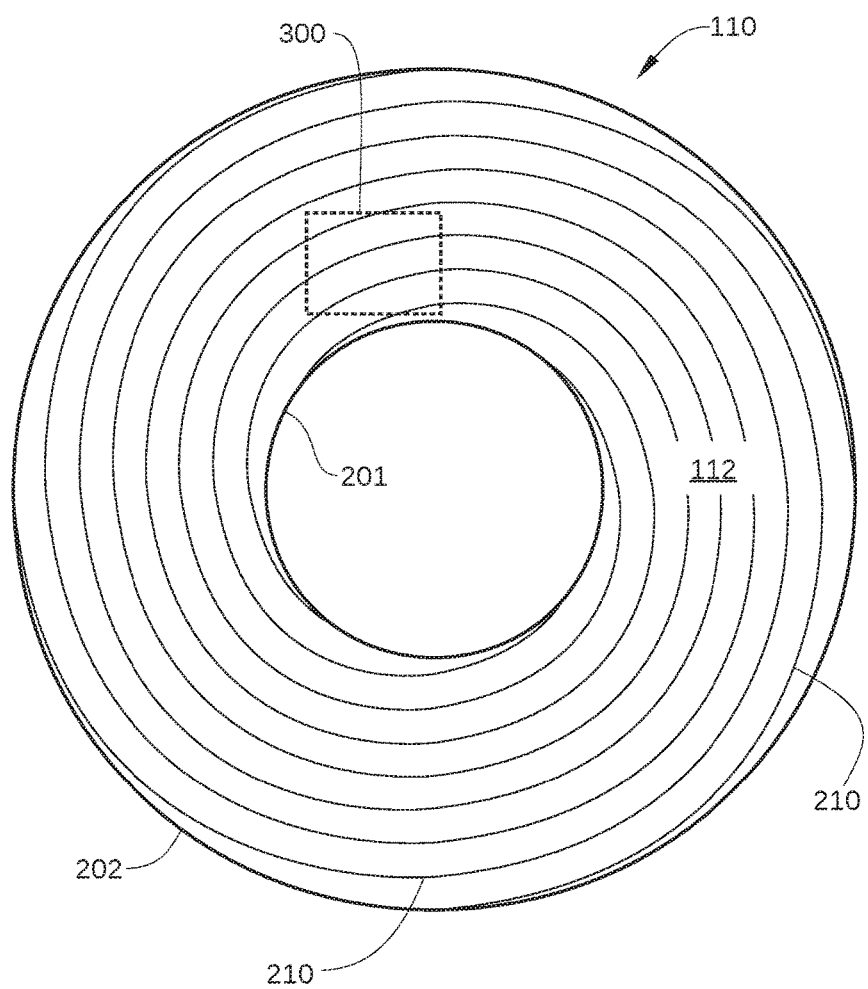
FIG. 2 illustrates a storage disk of the hard disk drive of FIG. 1 prior to undergoing a servo self-write process, according to one embodiment.

FIG. 2 illustrates storage disk 110 prior to undergoing a SSW process, according to one embodiment. As shown, storage disk 110 has a plurality of reference spirals 210 written thereon that are each circumferentially spaced from adjacent reference spirals 210, and are each written continuously on recording surface 112 from an ID 201 and an OD 202 of storage disk 110. Reference spirals 210 may be written onto a substantially blank surface 112 of storage disk 110 as coarse guide spirals without the aid of external equipment using read/write head 127 and the servo system of HDD 100. For example, reference spirals 210 may be written on surface 112 with a bootstrap spiral-writing process, in which spirals are written by read/write head 127 while actuator arm assembly 120 is moved across surface 112 either by applying a suitable open loop voltage or current profile, or by using velocity control based on back EMF feedback. Alternatively, in some embodiments reference spirals 210 may be written onto a surface 112 that already has a previously written set of previously and more coarsely written spirals written thereon, such as the above-described coarse spirals (not shown for clarity). In such embodiments, reference spirals 210 are typically written onto surface 112 using closed-loop tracking of the previously and more coarsely written reference spirals.

Reference spirals 210 enable the generation of servo wedges or a more precisely positioned set of reference spirals on storage disk 110 using closed-loop control in the servo system of HDD 100. That is, servo wedges or servo spirals can be written while the servo system of HDD 100 uses closed-loop tracking of the reference spirals 210. It is noted that the number of reference spirals 210 written on storage disk 110 is generally larger than that shown in FIG. 2, for example as few as ten or twenty, or as many as several hundred.

During the SSW process, the servo system of HDD 100 uses the timing and position information provided by the above-described reference spirals 210 to servo precisely over a radial position on storage disk 110 that corresponds to a particular concentric data storage track. Thus, while the read head of read/write head 127 is used to read position and timing information from reference spirals 210, the write head of read/write head 127 is used to write servo wedges for a particular radial position on storage disk 110, i.e., for a particular data storage track of storage disk 110. Alternatively, while the read head of read/write head 127 is used to read position and timing information from reference spirals 210, the write head of read/write head 127 is used to write a new spiral across the stroke of actuator arm assembly 120.

It is noted that during the SSW process, a timing control module generates timing control signals, such as a timing error signal, for writing final servo wedges based on timing information read from reference spirals 210, and a position control module generates position information, such as a position error signal, based on position information read from reference spirals 210. For example, so that read/write head 127 produces phase-coherent signals when writing on storage disk 110, the timing of sync marks (described below) included in a reference spiral 210 is measured and a timing error signal generated. The timing control module then uses the timing error signal to modify the output of a phase-locked loop, which is the write clock of HDD 100.

The timing and position information read from reference spirals 210 are stored and synchronized with respect to each specific reference spiral 210. Consequently, for the successful execution of the SSW process, the servo interrupt service routine for demodulating the spirals must accurately track which spiral is currently being crossed. However, inaccurately written reference spirals 210 can impede or eliminate the ability of the servo interrupt service routine to accurately track individual reference spirals 210, as illustrated in FIGS. 3A and 3B.

Figure 3A:
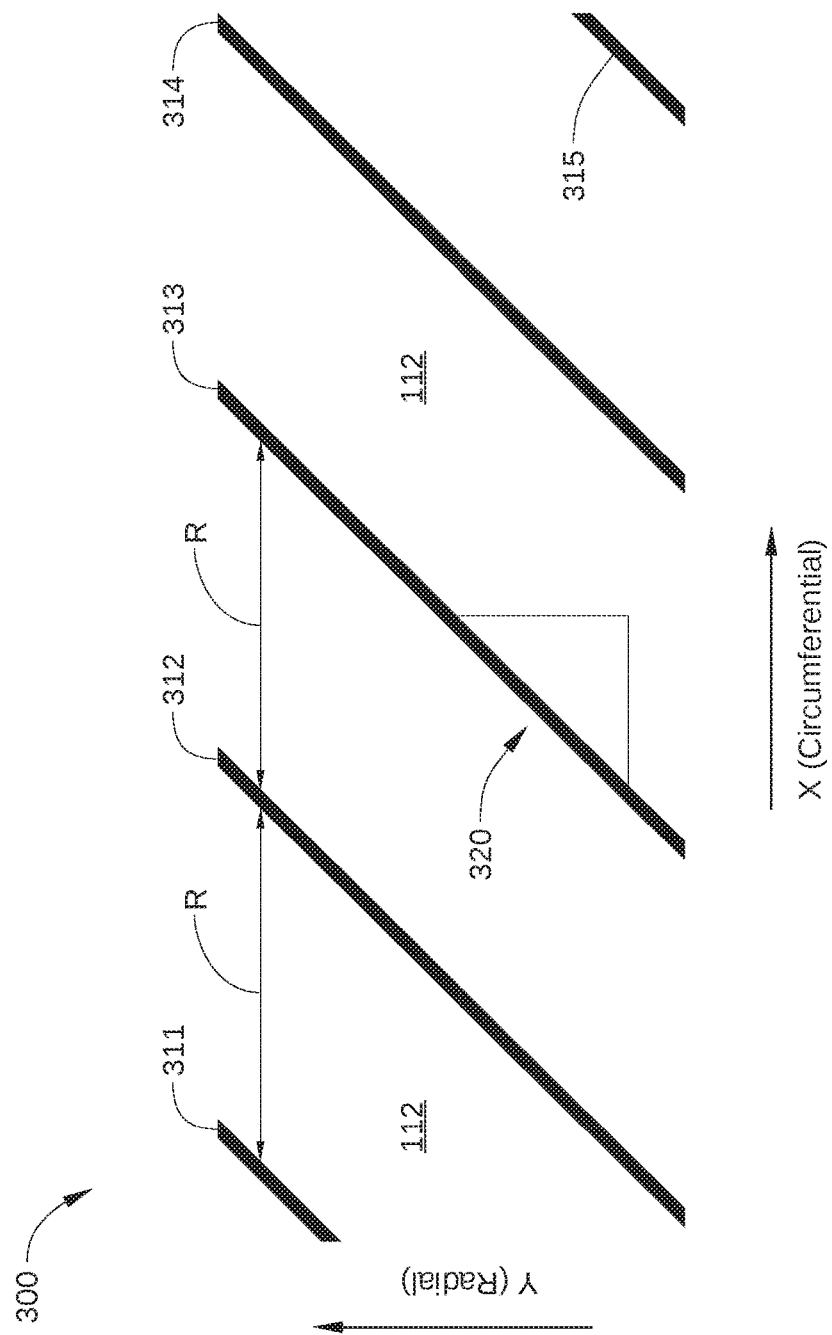
FIG. 3A is a schematic illustration of a portion of the storage disk indicated in FIG. 2 that includes ideal reference spirals.

FIG. 3A is a schematic illustration of a portion 300 of storage disk 110 indicated in FIG. 2 that includes ideal reference spirals 311-315. In the embodiment illustrated in FIG. 3A, portion 300 is depicted prior to undergoing a SSW process, and therefore no servo wedges are present on surface 112. As shown, a plurality of ideal reference spirals 311, 312, 313, 314, and 315 are formed on surface 112 of storage disk 110. Displacement along the x-axis in FIG. 3 is illustrated as circumferential (or angular) displacement, such as radians or degrees, while displacement along the y-axis is illustrated as linear (or radial) displacement.

Ideal reference spirals 311-315 are ideally formed, i.e., without positional error. Consequently, it may be assumed that read/write head 127 has written each of ideal reference spirals 311-315 using an identical radial velocity profile, and ideal reference spirals 311-315 may be assumed to be circumferentially separated from each other by a substantially uniform angular separation R at any particular radial location on storage disk 110. Thus, ideal reference spirals 311-315 can be depicted as parallel lines in FIG. 3 having the same spiral pitch 320 or slope. As a result, assuming a constant rotational velocity for storage disk 110, when read/write head 127 is positioned at any particular radial location, a time required for read/write head 127 to travel from one to another of ideal reference spirals 311-315 is substantially a constant time interval. Further, because none of ideal reference spirals 311-315 crosses an adjacent spiral or is closely spaced from an adjacent spiral, a servo interrupt routine for demodulating the spirals can accurately track which of ideal reference spirals 311-315 is currently being crossed by read/write head 127.

Figure 3B:
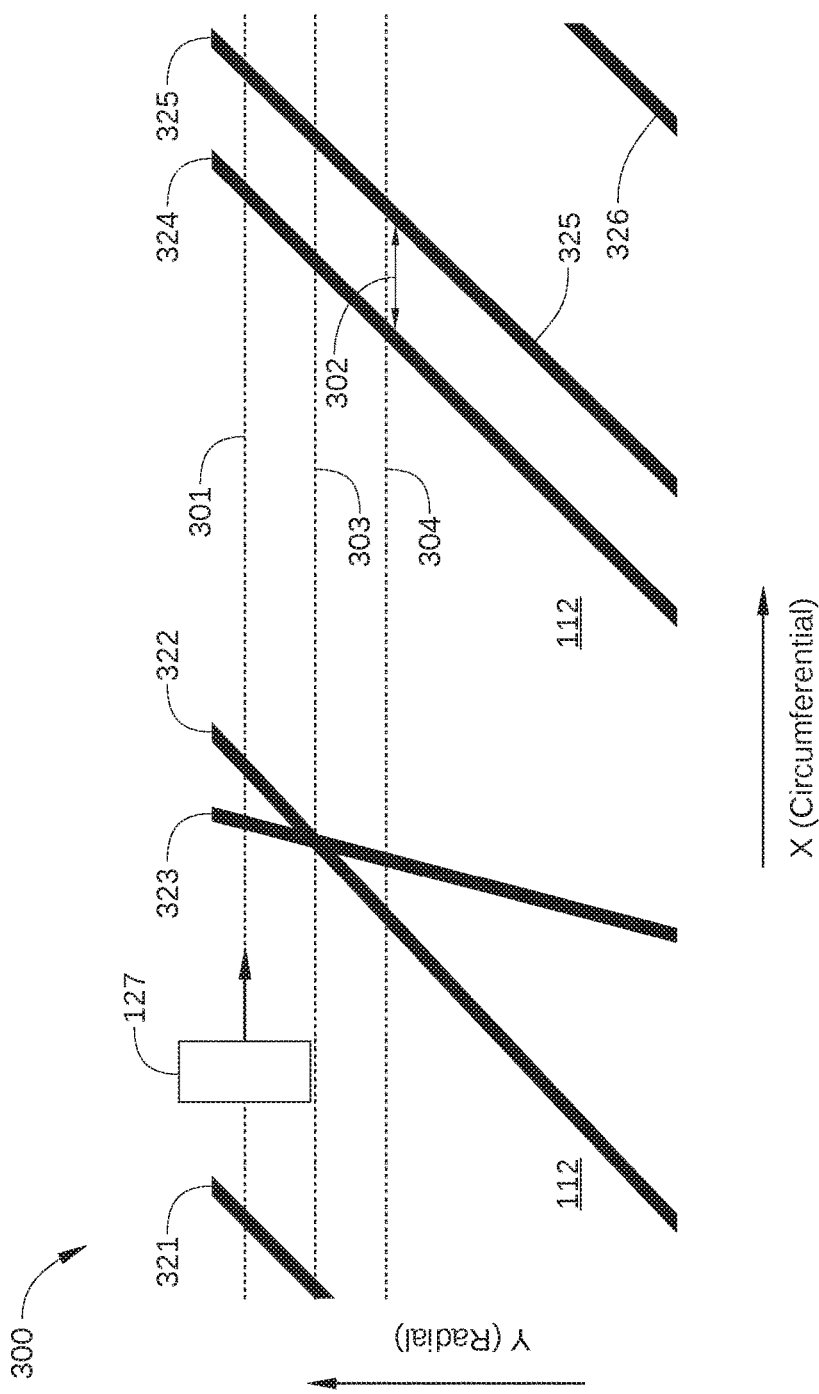
FIG. 3B is a schematic illustration of a portion of the storage disk indicated in FIG. 2 that includes non-ideal reference spirals, according to one embodiment.

FIG. 3B is a schematic illustration of portion 300 of storage disk 110 indicated in FIG. 2 that includes non-ideal reference spirals 321-326. In the embodiment illustrated in FIG. 3B, portion 300 is depicted prior to undergoing a SSW process, and therefore no servo wedges are present on surface 112. As shown, in practice the placement of non-ideal reference spirals 321-326 is such that not all of non-ideal reference spirals 321-326 are parallel with each other, nor adequately spaced from each other to ensure that a servo interrupt routine employed during an SSW process can accurately determine which reference spiral is being crossed. Specifically, some of non-ideal reference spirals 321-326 may cross each other, thereby changing the order in which read/write head 127 crosses such reference spirals during the SSW process, and/or overwriting a previously written reference spiral. In addition, some of non-ideal reference spirals 321-326 are spaced too closely to allow the servo interrupt routine of an SSW process to detect each and every one of non-ideal reference spirals 321-326.

In the embodiment illustrated in FIG. 3B, non-ideal reference spiral 323 crosses over non-ideal reference spiral 322. Thus, when read/write head 127 servos off of non-ideal reference spirals 321-326 at radial location 301, read/write head 127 crosses non-ideal reference spiral 323 before crossing non-ideal reference spiral 322, even though non-ideal reference spiral 322 is the next expected reference spiral to be crossed after read/write head 127 crosses non-ideal reference spiral 321. Thus, synchronization between the reference spirals on surface 112 used for servoing and the spiral data tables storing timing and position data for each of these reference spirals is lost. Consequently, the servo system of HDD 100 may be unable to servo accurately over radial location 301. Further, at radial position 303, non-ideal reference spiral 323 overwrites a portion of non-ideal reference spiral 322. Thus, when read/write head 127 attempts to servo off of non-ideal reference spirals 321-326 at radial position 303, timing and position data for non-ideal reference spiral 322 is not read at all, which can also cause synchronization between non-ideal reference spirals 321-326 and the spiral data tables storing timing and position data for each of these reference spirals at radial location 303 to be lost.

In the embodiment illustrated in FIG. 3B, another issue is also shown with non-ideal reference spiral 321-326. Specifically, non-ideal reference spiral 325 is located relatively close to non-ideal reference spiral 324, so that non-ideal reference spiral 324 and non-ideal reference spiral 325 are only separated by circumferential distance 302. As a result, after passing over non-ideal reference spiral 324, read/write head 127 may pass over non-ideal reference spiral 325 before the servo interrupt service routine or read channel 137 or other ASIC hardware is prepared for additional spiral timing and position data, thereby causing loss of servo data associated with non-ideal reference spiral 325. In such an instance, the servo system of HDD 100 does not detect non-ideal reference spiral 325 at all, which can also cause loss of synchronization between the reference spirals on surface 112 and the spiral data tables storing timing and position data for each of these spirals.

According to embodiments, each non-ideal reference spiral written on surface 112 is configured to be distinguished during demodulation from adjacent servo spirals on the same surface 112. Specifically, when a set of servo spirals is written on a disk surface, and together are configured to provide closed-loop tracking of the radial position and timing control of read/write head 127, a first spiral is written to include a first identifying characteristic and the following spiral is written to include a second identifying characteristic. Thus, a particular reference spiral is uniquely identified from adjacent reference spirals in the set of servo spirals, and the servo system of HDD 100 can determine that an unexpected spiral has been crossed and act accordingly.

For example, in such embodiments, non-ideal reference spirals 321, 323, 325, and so on can be configured with the first identifying characteristic, while non-ideal reference spirals 322, 324, 326, and so on can be configured with the second identifying characteristic. As a result, when non-ideal reference spiral 323 crosses non-ideal reference spiral 322 so that read/write head 127 passes over non-ideal reference spiral 323 before non-ideal reference spiral 322, the servo system of HDD 100 can determine that an unexpected spiral has been crossed, and act accordingly. Thus, the servo system of HDD 100 does not employ the timing and position information provided by non-ideal reference spiral 323, since such information is not associated with the next expected reference spiral, i.e., non-ideal reference spiral 322. Instead, the servo system of HDD 100 is configured to control the radial position of read/write head 127 and timing of signals written by read/write head 127 using one or more modified control procedures until an expected servo spiral is crossed and the timing and position information provided by an expected servo spiral can be employed normally.

In some embodiments, one such modified control procedure includes ignoring the newly detected timing and position information associated with an unexpected (i.e., out-of-order) reference spiral, and instead employing previously measured position and timing values for the expected reference spiral. In such embodiments, the previously measured position and timing values for the expected spiral are measured in a preceding revolution of storage disk 110. For example, in the scenario illustrated in FIG. 3B, when the servo system of HDD 100 determines that an unexpected reference spiral (in this case non-ideal reference spiral 323) has been crossed by read/write head 127 at radial position 301 instead of the expected spiral (in this case non-ideal reference spiral 322), the servo system of HDD 100 uses position and timing values for the expected spiral at a nearby radial position, such as radial position 304. Thus, when read/write head 127 passes over non-ideal reference spiral 323 at radial position 301, different timing and position information are employed to control the radial position of read/write head 127 and timing of signals written by read/write head 127 than the timing and position information detected when read/write head 127 passes over non-ideal reference spiral 323. In such embodiments, to avoid possible transient effects that may occur near intersecting spirals, previously measured position and timing values may also be employed for the unexpected reference spiral. Furthermore, in such embodiments, the previously measured position and timing values for the expected reference spiral may be used for a single revolution, a limited number of revolutions, or for all revolutions while read/write head 127 is positioned at radial location 301.

Alternatively, when the servo system of HDD 100 determines that an unexpected reference spiral has been crossed at radial position 301 instead of the expected spiral, the servo system of HDD 100 uses newly estimated position and timing values for the expected spiral. For example, the newly estimated timing and position values for the expected spiral may be calculated based on previously measured timing and position values for a nearby radial position, such as radial position 304, and modified accordingly. In such embodiments, newly estimated position and timing values may also be assumed by the servo system of HDD 100 for the unexpected spiral, thereby avoiding possible transient effects that may occur near intersecting spirals.

In some embodiments, another modified control procedure includes adjusting expected indices of reference spirals for a subsequent revolution or revolutions of storage disk 110. Because the servo system of HDD 100 is generally configured to receive signals from each reference spiral in a set of reference spirals in a predetermined order defined by sequential index values for each reference spiral, in such embodiments the servo system of HDD 100 is configured to change the order in which timing and position information is expected to be received from reference spirals in the set of reference spirals. For example, in the scenario illustrated in FIG. 3B, the servo system of HDD 100 is generally configured to receive timing and position information first from non-ideal reference spiral 321, then from non-ideal reference spirals 322, 323, 324, 325, and 326 in that order. However, when an out-of-order spiral is detected, such as non-ideal reference spiral 323 in FIG. 3B, the servo system of HDD 100 is configured to adjust the expected indices of the reference spirals being used to control the position of read/write head 127. Thus, in subsequent revolutions of storage disk 110, the servo system of HDD 100 is configured to receive timing and position information from reference spirals in the following order: from non-ideal reference spiral 321, 323, 322, 324, 325, and 326. Consequently, the servo system of HDD 100 correctly looks up spiral-specific position and timing information in the tables of tuned and calibrated values for non-ideal reference spirals 321-326, even though non-ideal reference spirals 321-326 are not crossed by read/write head 127 in the originally expected order.

It is noted that in embodiments in which a modified control procedure includes adjusting expected indices of reference spirals when an unexpected reference spiral is detected, how the expected reference spiral indices are adjusted generally depends on why the unexpected reference spiral has been detected instead of the expected spiral. More specifically, expected reference spiral indices are adjusted differently depending on at least four different scenarios: (1) the unexpected spiral crosses the expected spiral and is read out of order (see non-ideal reference spirals 322 and 323 at radial location 301); (2) the unexpected spiral overwrites the expected spiral and therefore the expected spiral is unreadable at the current radial location (see non-ideal reference spirals 322 and 323 at radial location 303); (3) an expected spiral is correctly located after a preceding spiral, but is written so close to the preceding spiral that the expected spiral is not read or read channel 137 or other ASIC hardware does not have sufficient time to process spiral data, and a subsequent spiral is then read as an unexpected spiral (see non-ideal reference spirals 324, 325, and 326, where non-ideal reference spiral 325 will not be read or processed in time by read channel 137 or ASIC hardware and non-ideal reference spiral 326 will be read as an unexpected spiral); and (4) an unexpected spiral is located before the expected spiral, and is written so close to the unexpected spiral that the expected spiral is not read (not shown).

In scenario (1), the expected reference spiral indices for a particular set of reference spirals may be adjusted so that the expected order of the unexpected reference spiral and the expected reference spiral is swapped. Thus, for the scenario illustrated by non-ideal reference spirals 322 and 323 at radial location 301, after non-ideal reference spiral 323 has been identified as an unexpected spiral and reference spiral indices changed accordingly, the expected order of reference spirals is: non-ideal reference spiral 321, 323, 322, 324, 325, and 326.

In scenario (2), the expected reference spiral indices for a particular set of reference spirals may be adjusted to skip the expected reference spiral, since the expected reference spiral is unreadable or cannot be processed in time by read channel 137 or ASIC hardware at the current radial location. Thus, for the scenario illustrated by non-ideal reference spirals 322 and 323 at radial location 303, after non-ideal reference spiral 323 has been identified as an unexpected spiral, the expected order of reference spirals is: non-ideal reference spiral 321, 323, 324, 325, and 326. Consequently, the servo system of HDD 100 correctly looks up spiral-specific position and timing information in the tables of tuned and calibrated values for non-ideal reference spirals 321, 323, 324, 325, and 326, even though position and timing information for non-ideal reference spiral 322 cannot be read by read/write head 127 at the current radial location. Alternatively, in scenario (2) previously measured timing and position values, denoted with an asterisk, may be incorporated into the expected order of reference spirals, so that the expected order of reference spirals is: non-ideal reference spiral 321, 322\*, 323, 324, 325, 326.

In scenario (3), the expected reference spiral indices for a particular set of reference spirals may be adjusted to skip the expected reference spiral that is normally read immediately prior to the unexpected spiral, since the skipped reference spiral is unreadable at the current radial location. Thus, for the scenario illustrated by non-ideal reference spirals 324, 325, and 326, after non-ideal reference spiral 326 has been identified as an unexpected spiral, the expected order of reference spirals is: non-ideal reference spiral 321, 322, 323, 324, and 326. Therefore, the servo system of HDD 100 correctly looks up spiral-specific position and timing information in the tables of tuned and calibrated values for non-ideal reference spirals 321, 322, 323, 324, and 326, even though position and timing information for non-ideal reference spiral 325 cannot be read by read/write head 127 or cannot be processed in sufficient time by read channel 137 or other ASIC hardware at the current radial location. Alternatively, in scenario (3) previously measured timing and position values may be incorporated into the expected order of reference spirals, to wit: non-ideal reference spiral 321, 322, 323, 324, 325\*, 326.

In scenario (4), the expected reference spiral indices for a particular set of reference spirals may be adjusted to skip the expected reference spiral, since the expected reference spiral is unreadable or cannot be processes in sufficient time by read channel 137 or other ASIC hardware due to the unexpected reference spiral being located directly prior to the expected reference spiral. Thus, in scenario (4), the expected order of reference spirals may be adjusted to that employed in scenario (2): non-ideal reference spiral 321, 323, 324, 325, and 326. Alternatively, in scenario (4), previously measured timing and position values may be incorporated into the expected order of reference spirals: non-ideal reference spiral 321, 322\*, 323, 324, 325, 326.

In general, in embodiments in which a modified control procedure includes adjusting expected indices of reference spirals when an unexpected reference spiral is detected, one or more additional reference spirals are crossed and identified by the servo system of HDD 100 before a particular scenario can be identified. That is, merely detecting that an unexpected spiral has been crossed is generally insufficient information to indicate why the unexpected reference spiral has been crossed instead of the expected spiral. Thus, in such embodiments, the servo system of HDD 100 is typically programmed or otherwise configured to ignore the newly detected timing and position information associated with an unexpected reference spiral in the revolution of storage disk 110 in which the unexpected reference spiral is detected until a subsequent revolution or revolutions of storage disk 110. However, in embodiments of HDD 100 in which servo control firmware is configured to be reprogrammed on the fly (i.e., within one revolution of storage disk 110), the servo system of HDD 100 can be configured to employ newly detected timing and position information associated with an unexpected reference spiral in the same revolution in which the unexpected reference spiral is detected.

As set forth above, in some embodiments, every other reference spiral in a set of reference spirals (e.g., non-ideal reference spirals 321, 323, 325, and so on) are configured with a first identifying characteristic, while the remaining reference spirals in the set of reference spirals (e.g., non-ideal reference spirals 322, 324, 326, and so on) are configured with a second identifying characteristic. Thus, via two different identifying characteristics, any reference spiral in the set of spirals can be distinguished from adjacent reference spirals in the same set of spirals. More generally, any number N of identifying characteristics may be incorporated into different reference spirals in a set of spirals, so that any reference spiral in the set of spirals can be distinguished from the N−1 closest reference spirals. One such example is illustrated in FIG. 4.

Figure 4:
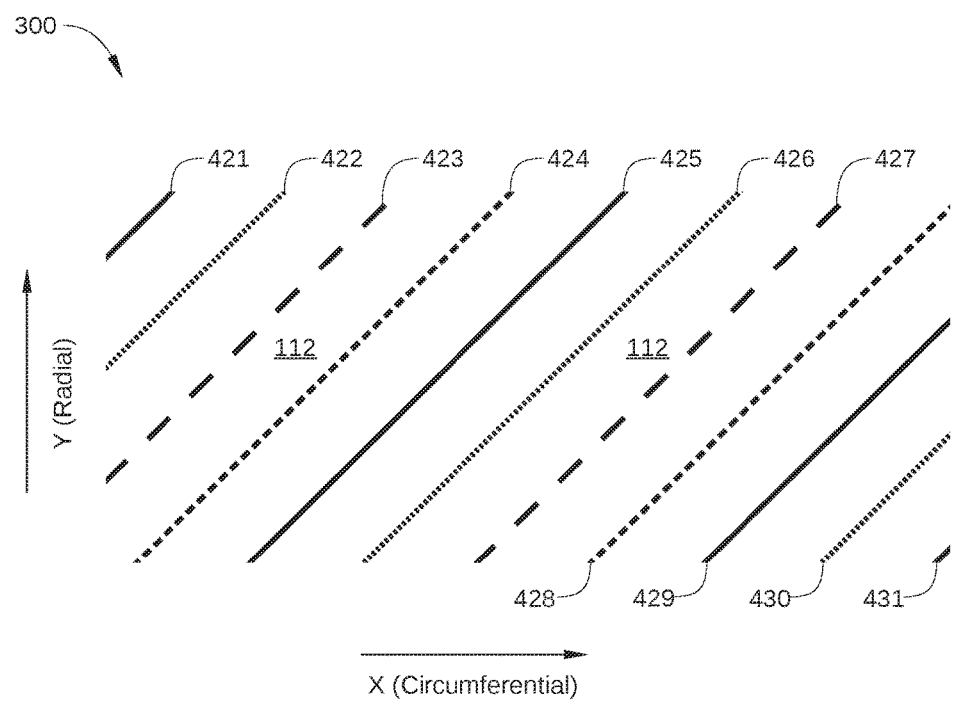
FIG. 4 is a schematic illustration of a portion of the storage disk indicated in FIG. 2 that includes reference spirals that are configured with various identifying characteristics, according to an embodiment.

FIG. 4 is a schematic illustration of portion 300 of storage disk 110 indicated in FIG. 2 that includes reference spirals 421-431 that are configured with various identifying characteristics, according to an embodiment. In the embodiment illustrated in FIG. 4, reference spirals 421-431 are part of a specific spiral set 410, and may be substantially similar to non-ideal reference spirals 321-326 in FIG. 3B, except that each of reference spirals 421-431 includes one of four different identifying characteristics. Thus, in FIG. 4, the number N of identifying characteristics equals four. Each of these four different identifying characteristics is depicted schematically with a different line style. Because every Nth (i.e., fourth) reference spiral in the set of spirals on surface 112 includes the same identifying characteristic, any reference spiral in spiral set 410 can be distinguished from the N−1 closest reference spirals. Thus, because N=4 in FIG. 4, the servo system of HDD 100 can distinguish any one of reference spirals 421-431 from the three reference spirals that are closest in expected order in either direction. To wit, the identifying characteristic included in reference spiral 424 enables the servo system of HDD 100 to distinguish reference spiral 424 from reference spirals 421-423 and 425-427 when passed over by read/write head 127. Thus, in the event that reference spiral 426 crosses and overwrites a portion of reference spiral 424, based on the identifying characteristic included reference spiral 424 (the expected spiral) and the different identifying characteristic included in reference spiral 426 (the unexpected spiral), the servo system of HDD 100 can readily determine that an unexpected spiral has been detected, and act accordingly.

As noted previously, various types of identifying characteristics may be employed to distinguish reference spirals within a particular set of reference spirals. For example, in some embodiments, each reference spiral includes an embedded sync mark that encodes one of two or more specific numerical values, where each numerical values is an identifying characteristic. Alternatively or additionally, each reference spiral includes one of two or more specific frequencies of high-low transitions, where each specific frequency is an identifying characteristic. Alternatively or additionally, each reference spiral includes one of two or more specific frame sizes (distance between sync marks within a reference spiral), where each specific frame size is an identifying characteristic. Embodiments of reference spirals that include embedded sync marks with encoded numeric values, different frequencies of high-low transitions, and/or different frame sizes are described below in conjunction with FIGS. 5-7.

Figure 5:
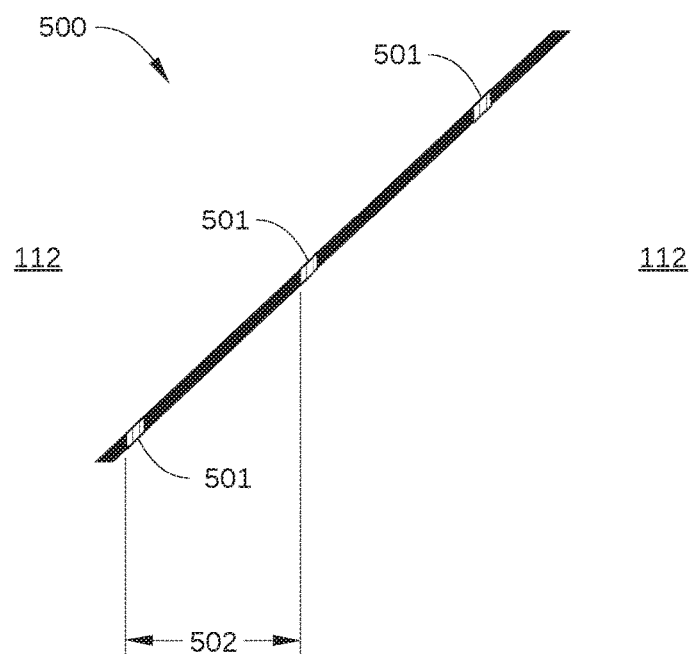
FIG. 5 is a schematic illustration of a reference spiral written on a surface of the hard disk drive of FIG. 1, according to an embodiment.

FIG. 5 is a schematic illustration of a reference spiral 500 written on surface 112 of HDD 100, according to an embodiment. Reference spiral 500 may be substantially similar to reference spirals 210 of FIG. 2. As shown, reference spiral 500 includes sync marks 501 that are configured to provide position and timing information to the servo system of HDD 100 when passed over by read/write head 127. To that end, sync marks 501 are evenly spaced along reference spiral 500 at a uniform interval, sometimes referred to as a frame 502. Reference spiral 500 is configured so that a signal of a specific fixed frequency is generated by read/write head 127 when read/write head 127 passes over reference spiral 500 during normal rotation of storage disk 110. Specifically, reference spiral 500 includes high-low transitions or peaks that can each be interpreted as a bit of information in a read signal from read/write head 127, and each frame 502 includes an identical number of such bits. One embodiment of such a read signal is illustrated in FIG. 6.

Figure 6:
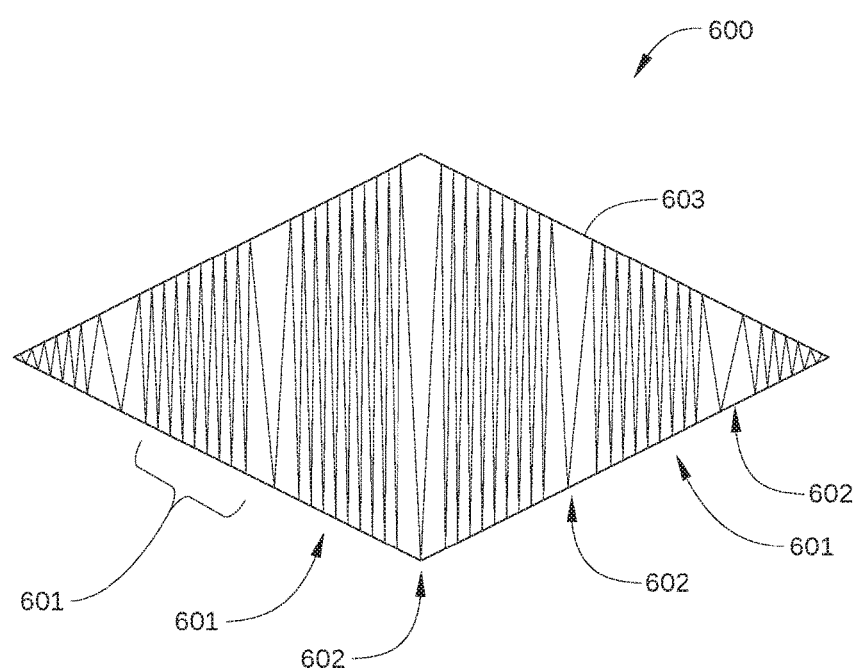
FIG. 6 is a schematic illustration of a read signal that is generated when a read/write head passes over a reference spiral, according to one embodiment.

FIG. 6 is a schematic illustration of a read signal 600 that is generated when read/write head 127 passes over a reference spiral 500, according to one embodiment. In FIG. 6, signal amplitude of read signal 600 is indicated vertically and signal duration of read signal 600 is indicated horizontally. Read signal 600 includes a plurality of high-frequency transitions 601 interrupted by sync mark signals 602, where the beginning of each sync mark signal is evenly spaced (in time) from adjacent sync mark signals 602 by a frame 502.

High-frequency transitions 601 correspond to the constant high-frequency pattern included in reference spiral 500 being crossed, while sync marks 602 correspond to the synchronization marks included in the reference spiral 210 being crossed by the read head. Read signal 600 also includes an envelope 603, which is a smooth curve that outlines the extremes of the oscillating signal associated with high-frequency transitions 601 and sync marks 602. When read/write head 127 moves in the radial direction over storage disk 110, envelope 603 will shift with respect to sync marks 602 (left or right in FIG. 6). Thus, a shift in the position of envelope 603 relative to sync marks 602 provides position-error signal (PES) for servoing read/write head 127.

According to some embodiments, a specific reference spiral 500 can be configured with an identifying characteristic that is manifested in read signal 600, and therefore can be detected by the servo system of HDD 100. When the identifying characteristic is detected, the servo system of HDD 100 can then distinguish the specific reference spiral 500 from other reference spirals, and can therefore determine whether the specific reference spiral 500 is an expected reference spiral or an unexpected reference spiral.

In some embodiments, a particular reference spiral 500 is configured with a specific length of frame 502 as an identifying characteristic, such as 20 bits, and adjacent reference spirals 500 are configured with a different length of frame 502 as a different identifying characteristic, such as 30 bits. Thus, based on the length of frame 502, when read/write head 127 passes over the particular reference spiral 500, the servo system of HDD 100 can immediately determine the particular reference spiral 500 was passed over and not one of the adjacent reference spirals 500.

In some embodiments, a particular reference spiral 500 is configured with sync marks 501 that each encode a specific numerical value as an identifying characteristic, while adjacent reference spirals 500 are configured with with sync marks 501 that each encode a different numerical value. Thus, based on the numerical value encoded into the sync marks 501 of a particular reference spiral 500, when read/write head 127 passes over the particular reference spiral 500, the servo system of HDD 100 can immediately determine that particular reference spiral 500 was passed over, rather than a reference spiral adjacent to the particular reference spiral 500. One embodiment of a numerical value encoded in a read signal is illustrated in FIG. 7.

Figure 7:
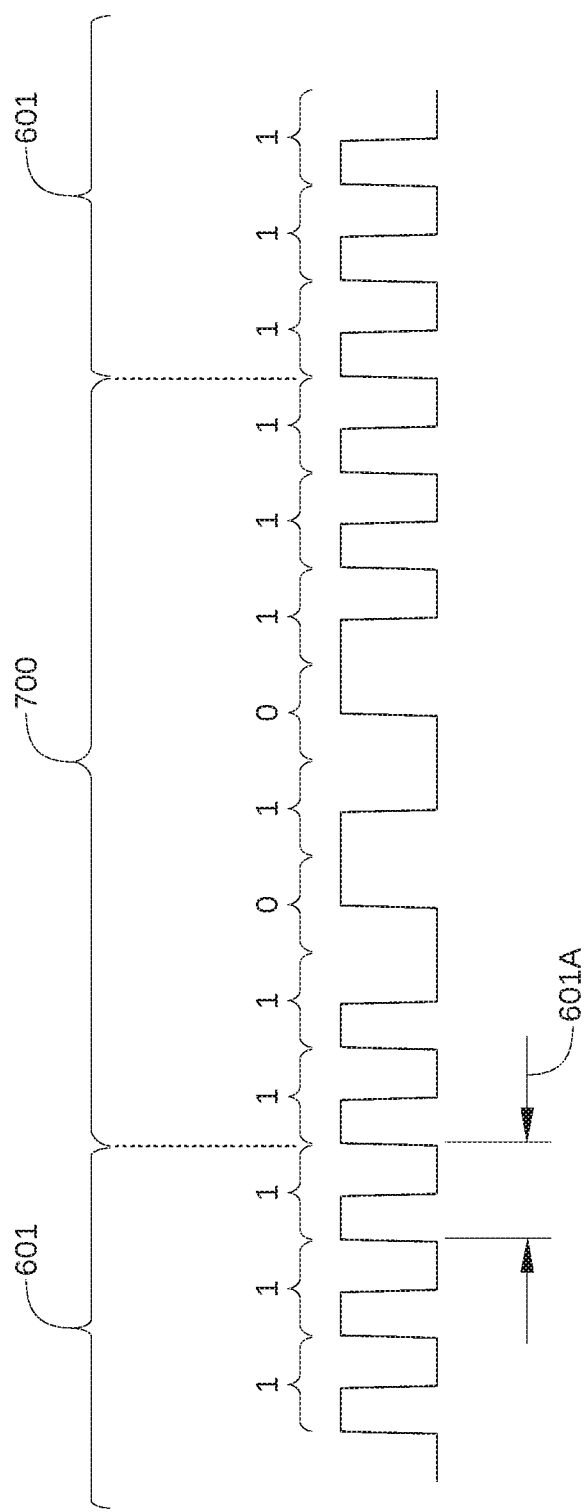
FIG. 7 schematically illustrates a sync mark signal that includes a numerical value encoded therein, according to an embodiment.

FIG. 7 schematically illustrates a sync mark signal 700 that includes a numerical value encoded therein, according to an embodiment. Sync mark signal 700 may be similar to sync mark signal 602 of read signal 600 in FIG. 6. Thus, sync mark signal 700 is generated when read/write head 127 passes over a sync mark 501 of a reference spiral 500, and is disposed between high-low transitions 601 that correspond to the constant high-frequency pattern included in the reference spiral 500 being crossed by read/write head 127. It is noted that, in the context of reference spirals and sync mark signals included in reference spirals, signal frequency is based on a wavelength 601A of high-low transitions 601.

Unlike high-low transitions 601, which can be interpreted numerically as a continuous series of 1's (or a continuous series of 0's), sync mark signal 700 includes one or more bits that vary from the continuous bit value of high-low transitions 601. For example, in the embodiment illustrated in FIG. 7, sync mark signal 700 includes a total of eight bits, and two of these bits have a value of 0. Thus, in this embodiment, the encoded numerical value of sync mark signal 700 is 215 (128+64+16+4+2+1), which can be employed by the servo system of HDD 100 as an identifying characteristic of the associated reference spiral 500. As a result, the reference spiral 500 associated with sync mark signal 700 can be distinguished from adjacent reference spirals 500 in the same set of spirals. Further, the reference spiral 500 associated with sync mark signal 700 can be distinguished from more than just adjacent reference spirals 500 in the same set of spirals when the number N of different identifying characteristics (i.e., encoded numerical values) is greater than two. For example, in some embodiments, each reference spiral 500 in the same set of reference spirals may be associated with a unique encoded numerical value.

In some embodiments, a particular reference spiral 500 is configured for the generation of a specific fixed frequency signal that acts as an identifying characteristic, and adjacent reference spirals 500 are configured for the generation of a different fixed-frequency signal that acts as a different identifying characteristic. Thus, based on wavelength 601A of high-low transitions 601, the servo system of HDD 100 can readily determine which reference spiral in a set of spirals has been crossed. In such embodiments, the servo system of HDD 100 may be configured with suitable hardware-implemented logic to facilitate detection of different fixed-frequency signals that are employed as identifying characteristics of specific reference spirals 500.

It is noted that conventional servo spiral schemes can include multiple sets of spirals written on one or more recording surfaces of an HDD, where the reference spirals in a first set of spirals are all configured for the generation of one fixed frequency signal and the reference spirals in a second set of spirals are all configured for the generation of a different fixed frequency signal. Thus, when a read/write head passes over a spiral on a recording surface that includes both the first and second sets of spirals, the servo system of the HDD can, based on the specific fixed frequency of the signal generated, determine whether the read/write head has passed over a reference spiral included in the first set of spirals or in the second set of spirals. By contrast, according to embodiments described herein, based on the specific fixed frequency of the signal generated when read/write head 127 passes over a reference spiral, the servo system of HDD 100 can distinguish between reference spirals within a particular set of reference spirals, and not just between sets of reference spirals.

Figure 8A:
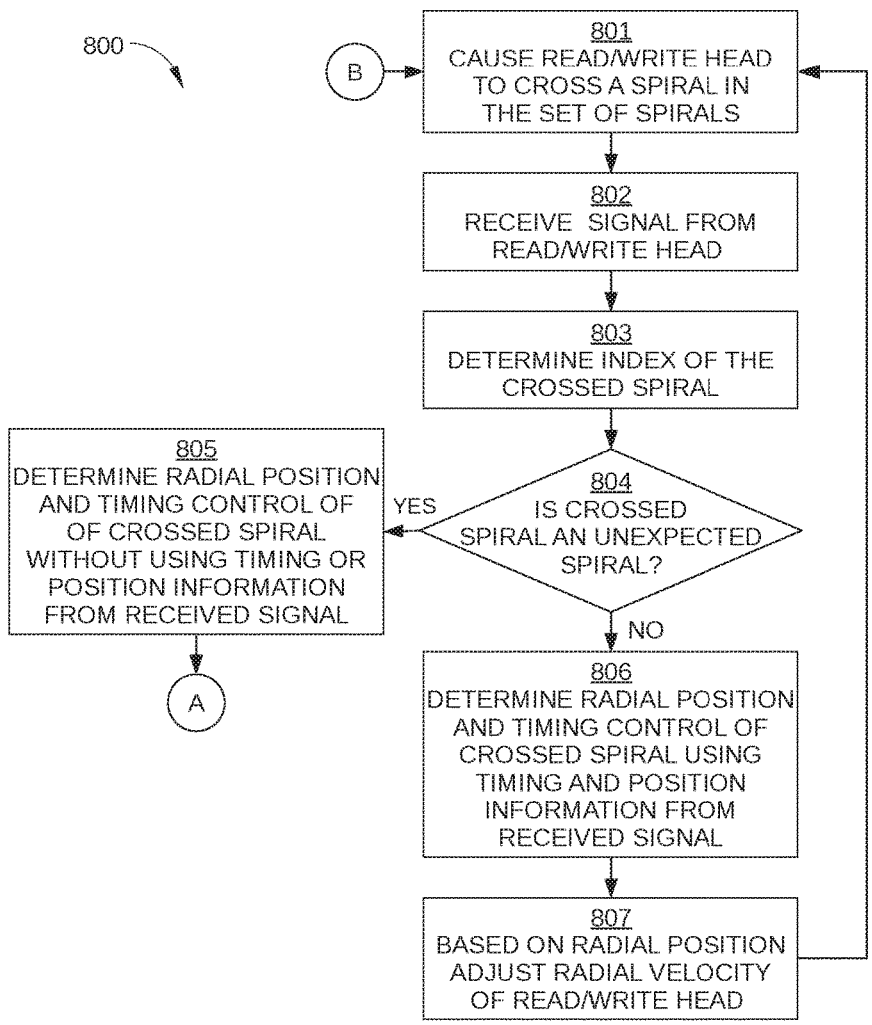
FIGS. 8A and 8B set forth a flowchart of method steps for positioning a write head based on signals generated by a read head as the read head crosses a set of servo spirals, according to an embodiment.
Figure 8B:
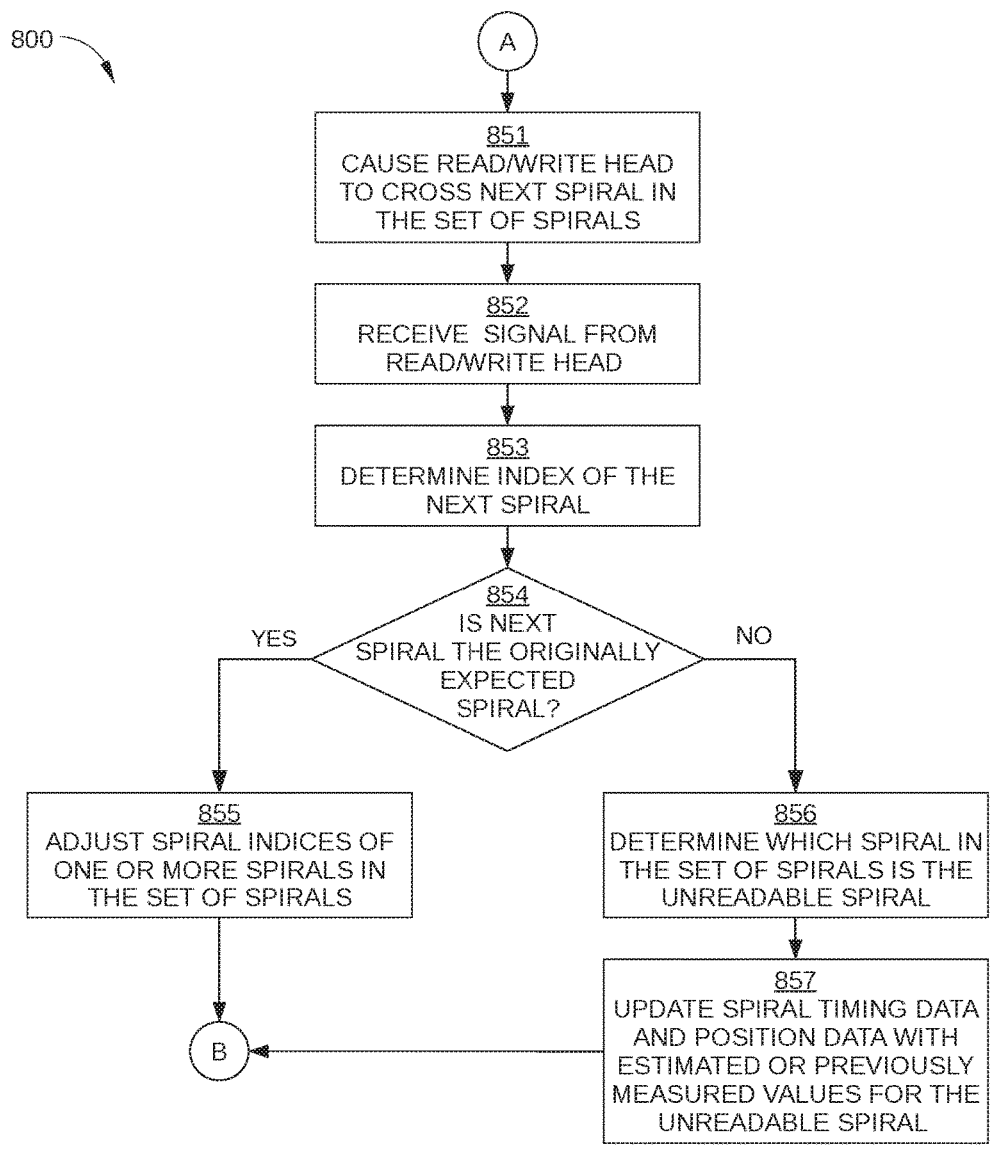

FIGS. 8A and 8B set forth a flowchart of method steps for positioning a write head and adjustment of write signal timing based on signals generated by a read head as the read head crosses a set of servo spirals, according to an embodiment. Although the method steps are described in conjunction with HDD 100 of FIGS. 1-7, persons skilled in the art will understand that the method steps 800 may be performed with other hard disk drives. The control algorithms for the method steps may reside in and/or be performed by microprocessor-based controller 133 and/or any other suitable control circuit or system, including an external host. In some embodiments, method 800 may be employed during an SSW process, in which final product servo wedges are written on a recording surface of HDD 100 while read/write head 127 servos off a previously written set of reference spirals. Further, in some embodiments, method 800 may be employed during a spiral-writing process, in which a more precisely positioned set of reference spirals are written on a recording surface of HDD 100 while read/write head 127 servos off a previously and more coarsely written set of reference spirals.

As shown, a method 800 begins at step 801, where microprocessor-based controller 133 (or other suitable control circuit or system) causes read/write head 127 to cross a reference spiral written on a recording medium, such as surface 112 of storage disk 110. The reference spiral being crossed, which is hereinafter referred to as the "crossed spiral," is included in a set of reference spirals that is configured to provide timing and position information for positioning read/write head 127 with respect to surface 112 over a complete rotation of the writable surface. In some embodiments, each reference spiral in the set of reference spiral includes a particular identifying characteristic that indicates that each such reference spiral is included in that particular set of reference spirals. For example, the particular identifying characteristic may be a predetermined frequency range of signal that is generated as read/write head 127 crosses any reference spiral in the set of reference spirals. It is noted that the particular identifying characteristic that indicates that each such reference spiral is included in the set is different from the identifying characteristics that distinguish individual reference spirals within the set of reference spirals. It is further noted that, in some embodiments, each reference spiral in the set of reference spirals is written continuously on surface 112 from an inner diameter region to an outer diameter region of surface 112, or vice versa.

In step 802, microprocessor-based controller 133 receives a signal from read/write head 127 that is generated as read/write head 127 crosses the crossed spiral in step 801. Generally, the received signal includes high-frequency transitions 601 interrupted by sync mark signals, such as sync mark signal 700, and thus provides a position error signal for the radial position of read/write head 127 and a timing error signal for the timing of signals written by read/write head 127. The received signal also includes an identifying characteristic, as described above.

In step 803, microprocessor-based controller 133 determines whether the crossed spiral is an unexpected spiral. If microprocessor-based controller 133 determines the crossed spiral has been crossed by read/write head 127 out of order, and therefore is an unexpected spiral, method 800 proceeds to step 804; if not, method 800 proceeds to step 805.

In some embodiments, in step 803 microprocessor-based controller 133 can determine that the crossed spiral is an unexpected spiral based on the identifying characteristic included in the signal received in step 802. For example, in embodiments in which each reference spiral in the set of reference spirals includes a different, unique identifying characteristic, each reference spiral in a set of reference spirals can be identified based only on the identifying characteristic included in the signal received in step 802. Consequently, once the crossed spiral is identified, microprocessor-based controller 133 can readily determine whether the crossed spiral has been crossed out of order with respect to the most recently crossed spiral in the set of spirals, and therefore is an unexpected spiral.

In embodiments in which each reference spiral in the set of reference spirals does not include a unique identifying characteristic, the identifying characteristic included in the signal received in step 802 may not be sufficient information for microprocessor-based controller 133 to determine whether the crossed spiral is an unexpected spiral. Thus, in such embodiments, microprocessor-based controller 133 can instead determine that the crossed spiral is an unexpected spiral based on the identifying characteristic included in the signal received in step 802 in conjunction an identifying characteristic included in a signal received when a previous reference spiral was crossed by read/write head 127. For example, in one such embodiment, a first unique identifying characteristic is included in every other reference spiral in a set of spirals and a second identifying characteristic is included in the remaining reference spirals in the set of spirals. In such an embodiment, the crossed spiral should have one identifying characteristic (e.g., the first unique identifying characteristic) and the previously crossed reference spiral should have a different identifying characteristic (e.g., the second unique identifying characteristic). Thus, when the crossed spiral and the previously crossed reference spiral are both determined to have the same identifying characteristic, microprocessor-based controller 133 determines that the crossed spiral is an unexpected spiral.

In step 804, microprocessor-based controller 133 determines the current radial position of read/write head 127 and the timing of signals written by read/write head 127 without using timing or position information from the signal received in step 802. Instead, microprocessor-based controller 133 employs a modified control procedure. For example, rather than determining the radial location of read/write head 127 and timing control of signals written by read/write head 127 based on position information received in response to the unexpected spiral being crossed, microprocessor-based controller 133 determines the radial location of read/write head 127 and timing control of signals written by read/write head 127 based on previously measured position and timing values for the expected reference spiral or on estimated timing and position values for the expected spiral. In some embodiments, microprocessor-based controller 133 also adjusts the radial velocity of read/write head 127 based on the radial location of read/write head 127 determined in step 804; in other embodiments, microprocessor-based controller 133 allows read/write head 127 to "coast through" the crossed spiral, and does not adjust the radial velocity of read/write head 127 and timing control of signals written by read/write head 127 until a subsequent reference spiral is crossed by read/write head 127. Method 800 then proceeds to step 851 in FIG. 8B.

In step 805, microprocessor-based controller 133 determines the current radial position of read/write head 127 and timing control of signals written by read/write head 127 normally, using timing and/or position information from the signal received in step 802.

In step 806, microprocessor-based controller 133 adjusts the radial velocity of read/write head 127 and timing control of signals written by read/write head 127 normally, based on the current radial position of read/write head 127 determined in step 805. Method 800 then proceeds back to step 801 as show.

In step 851, shown in FIG. 8B, microprocessor-based controller 133 causes read/write head 127 to cross the next reference spiral in the set of reference spirals. The reference spiral being crossed in step 851, which is hereinafter referred to as the "next spiral," is also included in the set of reference spirals that includes the crossed spiral.

In step 852, microprocessor-based controller 133 receives a signal from read/write head 127 that is generated as read/write head 127 crosses the next spiral in step 851. Generally, the received signal includes high-frequency transitions 601 interrupted by sync mark signals, such as sync mark signal 700. The received signal also includes an identifying characteristic, as described above.

In step 853, microprocessor-based controller 133 determines an index value for the crossed spiral crossed in step 801 and an index value for the next spiral crossed in step 851. The index of a particular reference spiral is a unique value that is associated with that particular reference spiral. As such, the index value of one reference spiral can be employed by the servo system of HDD 100 to determine what the next expected reference spiral to be crossed should be. For instance, in a set of reference spirals that include M reference spirals, each of the M reference spirals may be numbered sequentially with a different index value from 1 and M. Thus, when the index of a crossed reference spiral has a value of 1, the next expected reference spiral to be crossed is the reference spiral with an index value of 2; when the index value of a crossed reference spiral is 2, the next expected reference spiral to be crossed is the reference spiral with an index value of 3; and so on.

In addition, the index of a particular reference spiral enables the storage of timing and position data for that particular reference spiral that have been measured in previous revolutions of storage disk 110. Such stored timing and position data facilitate operation of the servo system of HDD 100 when servoing off the set of spirals. It is noted that the indices of reference spirals are merely metadata associated the reference spirals, and therefore, in conventional HDDs, are software or firmware values, and are not determined based on any specific feature or characteristic of a reference spiral. That is, when a spiral is detected in a conventional HDD, the index value of the crossed spiral is assumed to be equal to the index value of the most recently crossed spiral incremented by one, and is not determined based on information included in the reference spiral. By contrast, according to various embodiments, the index value for the crossed spiral that is crossed in step 801 is determined based at least in part on identifying characteristics of the crossed spiral, and the index value for the next spiral that is crossed in step 851 is determined based at least in part on identifying characteristics of the next spiral.

In embodiments in which each reference spiral in the set of reference spirals includes a unique identifying characteristic, microprocessor-based controller 133 can determine the index of the crossed spiral based on the unique identifying characteristic of the crossed spiral and the index of the next spiral based on the unique identifying characteristic of the next spiral. In embodiments in which each reference spiral in the set of reference spirals does not include a unique identifying characteristic, the index of the crossed spiral and the index of the next spiral may be determined based on the identifying characteristics thereof in conjunction with the index of one or more previously or subsequently crossed reference spirals.

In step 854, based on the index of the crossed spiral and the index of the next spiral, microprocessor-based controller 133 determines whether the next spiral is the originally expected spiral in step 801. If yes, then the crossed spiral has intersected the next spiral, and is an unexpected spiral because read/write head 127 has crossed the crossed spiral before the expected spiral (see scenario (1) described in conjunction with FIG. 3B). In this case, method 800 proceeds to step 855. If no, then the crossed spiral is an unexpected spiral because a reference spiral has been overwritten or otherwise rendered unreadable or impossible to be processes by hardware in time (see scenarios (2), (3), and (4) described in conjunction with FIG. 3B), in which case method 800 proceeds to step 856.

In step 855, microprocessor-based controller 133 adjusts the indices of one or more reference spirals in the set of spirals. In step 855, the crossed spiral is assumed to be a reference spiral that is unexpectedly read before the next spiral. Consequently, at the current radial location of read/write head 127, the index of the crossed spiral is interchanged with the index of the next spiral. As a result, synchronization is maintained between the indices of the reference spirals (i.e., the firmware spiral numbers) and spiral data tables storing data for each of the reference spirals. Method 800 proceeds back to step 801 in FIG. 8A.

In step 856, which is performed in response to the determination that a reference spiral is unreadable, microprocessor-based controller 133 determines which spiral in the set of spirals is the unreadable spiral. For example, in some embodiments, microprocessor-based controller 133 determines what reference spiral is unreadable based on the index of the crossed spiral and on the index of the next spiral. Alternatively, in some embodiments, microprocessor-based controller 133 determines what reference spiral is unreadable based on the index of the crossed spiral, the index of the next spiral, and on the index of one or more subsequently crossed reference spirals in the set of spirals.

In step 857, microprocessor-based controller 133 updates timing and position data for the unreadable spiral with estimated or previously measured values for the unreadable spiral. Thus, the servo system of HDD 100 can continue to control the radial location of read/write head 127 and maintain the phase-coherence of signals written by read/write head 127 even though data for a reference spiral is unreadable at a particular radial location. After step 857, method 800 proceeds back to step 801.

In sum, embodiments herein provide systems and methods for positioning a write head and controlling timing of signals written by write head based on signals generated by a read head as the read head crosses a set of reference spirals, even when one or more reference spirals in the set is unreadable or intersects with other reference spirals. In an SSW write process, the servo system of an HDD distinguishes two or more different reference spirals in the same set of reference spirals based on two or more identifying characteristics of the reference spirals.

While the foregoing is directed to embodiments of the present invention, other and further embodiments of the invention may be devised without departing from the basic scope thereof, and the scope thereof is determined by the claims that follow.

I claim:

1. A data storage device comprising:
   a rotatable disk with a writable surface;
   a read head configured to generate a first signal as the read head crosses a first servo spiral written on the writable surface and a second signal as the read head crosses a second servo spiral written on the writable surface, wherein the first and second servo spirals are each written continuously on the writable surface and start from a first radial location of the writable surface and end at a second radial location of the writable surface;
   a read channel configured to detect signals of a predetermined frequency range; and
   a controller configured to distinguish between the first servo spiral and the second servo spiral when the detected signals of the predetermined frequency range include the first and second signals, based on identifying characteristics of the first and second signals.

2. The data storage device of claim 1, wherein the identifying characteristic of the first signal includes a first numeric value encoded in a sync mark of the first signal and the identifying characteristic of the second signal includes a second numeric value encoded in a sync mark of the second signal.

3. The data storage device of claim 1, wherein the identifying characteristic of the first signal includes high-low transitions of a first frequency and the identifying characteristic of the second signal includes high-low transitions of a second frequency.

4. The data storage device of claim 3, wherein the high-low transitions of the first frequency are generated by the read head passing over the first servo spiral and the high-low transitions of the second frequency are generated by the read head passing over the second servo spiral.

5. The data storage device of claim 1, wherein the identifying characteristic of the first signal includes a frame size between sync marks of the first signal and the identifying characteristic of the second signal includes a frame size between sync marks of the second signal.

6. The data storage device of claim 1, wherein the read head is further configured to generate a third signal as the read head crosses a third servo spiral written on the writable surface, wherein the third servo spiral is written continuously on the writable surface and starts from the first radial location of the writable surface and ends at the second radial location of the writable surface, and the read channel is configured to distinguish between the first servo spiral, the second servo spiral, and the third servo spiral based on identifying characteristics of the first, second, and third signals when the detected signals include the third signal.

7. The data storage device of claim 1, wherein the first servo spiral and the second servo spiral are included in a set of servo spirals that is configured to provide timing and position information for controlling timing of signals written by a write head and positioning a write head of the data storage device with respect to the writable surface over a complete rotation of the writable surface.

8. The data storage device of claim 7, wherein each servo spiral in the set of servo spirals is configured to generate a signal of the predetermined frequency range as the read head crosses the servo spiral.

9. The data storage device of claim 8, wherein the timing and position information is included in the generated signal of the predetermined frequency range.

10. The data storage device of claim 7, wherein all servo spirals in the set of servo spirals include a same identifying characteristic that is different from the identifying characteristics of the first and second signals.

11. A method of positioning a write head based on signals generated by a read head as the read head crosses a set of servo spirals that are each written continuously on a recording medium and start from a first radial location of the recording medium and end at a second radial location of the recording medium, the method comprising:
   receiving a first signal of a predetermined frequency range as the read head crosses a first spiral of the set of servo spirals;
   determining a first index based on a first identifying characteristic of the first signal;
   after receiving the first signal, receiving a second signal of the predetermined frequency range as the read head crosses a second spiral of the set of servo spirals;
   determining a second index based on a second identifying characteristic of the second signal;
   determining that the second index is an unexpected index; and
   responsive to determining that the second index is the unexpected index, determining a radial position error and a timing error of the write head without using timing or position data included in the second signal.

12. The method of claim 11, wherein the radial position of the write head corresponds to the read head crossing the second spiral.

13. The method of claim 11, wherein determining the radial position error and the timing error of the write head without using timing or position data included in the second signal comprises determining the radial position error and the timing error of the write head based on position and timing values for the second spiral that have been measured in a preceding revolution of the recording medium.

14. The method of claim 11, wherein determining the radial position error and the timing error of the write head without using timing or position data included in the second signal comprises determining the radial position error and the timing error of the write head based on estimated position and timing values for the second spiral.

15. The method of claim 11, wherein the first servo spiral and the second servo spiral are included in a set of servo spirals that is configured to provide timing and position information for adjustment timing of signals written by the write head and positioning the write head with respect to the writable surface over a complete rotation of the writable surface.

16. The method of claim 11, further comprising, based on the radial position of the write head, adjusting a radial velocity of the write head.

17. The method of claim 11, wherein the first spiral and second spiral are adjacent spirals in the set of servo spirals.

* * * * *